United States Patent Office 3,317,489
Patented May 2, 1967

3,317,489
METHOD FOR POLYMERIZING THIIRANES
Manfred Sander, Frankfurt am Main, Germany, assignor to Mobil Oil Corporation, a corporation of New York
No Drawing. Filed Mar. 3, 1964, Ser. No. 349,175
15 Claims. (Cl. 260—79)

This invention relates to an improved process for the polymerization of thiiranes which are also known as alkylene sulfides and alkylene episulfides. It is particularly concerned with the homopolymerization of these monomers by an improved catalytic procedure employing liquid media.

It is known that thiiranes can be polymerized to polyalkylene sulfides in the presence of basic catalysts. Basic catalysts that have been used previously include ammonia, pyridine, hydrazine, piperidine, primary amines, sodium hydroxide, sodium ethylate, sodium amide, potassum hydroxide, butyl lithium, naphthalene-sodium and alkali metals. Among these, the alkali metals proved to be highly active as polymerization catalysts. Carrying out the polymerization in a solution is also known; and this method has certain advantages in that the heat of reaction can be dissipated more easily and also that, in the case of ethylene sulfide, the polymer is obtained in dispersed form. The solvents employed have been relatively nonpolar liquids, such as hydrocarbons, ethers and cyclic ethers. Up to now, the use of polar solvents has been avoided, perhaps to prevent possible side reactions of the catalyst with the solvent.

It has now been discovered that with alkali metal catalysts certain polar solvents greatly increase the rate of polymerization and the resultant products are distinguished by substantially higher molecular weights than those of the products of polymerization in nonpolar solvents. Polymers produced by the novel process have mechanical properties improved in a degree corresponding approximately to their increased molecular weights. A further important advantage of using these polar solvents is found in the generally higher yields of the polymer. Still another advantage of the new method is that polymerization begins immediately upon addition of the catalyst, while in nonpolar solvents polymerization sets in only slowly or is initiated by heating.

The present invention comprises homopolymerizing thiiranes in the presence of a polar organic solvent having a dielectric constant above 10 (measured at 20° C.) in admixture with an alkali metal in a highly basic form capable of combining with acetone. Suitable polar solvents are also characterized by having not more than moderate proton acidity which may be measured by the acid dissociaton constant ($K_a$) or more conveniently by the constant $pK_a$ which is the negative logarithm of the acid dissociation constant. The $pK_a$ of the solvent should be substantially above 10, for example, it is typically above about 14 and the values above about 17 are preferred. Narrower aspects of the invention relate to the preferred solvents, namely the ketones, and especially the aliphatic monoketones as exemplified by acetone, as well as to the preferred forms of alkali metals which are sodium and potassium introduced in the form of the metal per se. Other aspects of the invention will be apparent to those skilled in the art upon consideration of the detailed disclosure hereinafter.

The influence of the polarity of the solvent on the polymerization of ethylene sulfide is illustrated in Table I which is based on polymerizing 5 grams of ethylene sulfide in 10 milliliters (ml.) of each of the designated solvents in the presence of 0.5 mol percent sodium metal (introduced as a 10% dispersion in toluene) with stirring for 24 hours at room temperature under a nitrogen atmosphere.

TABLE I

| Solvent | Dielectric Constant of Solvent at 20° C. | Polyethylene Sulfide Product | | |
|---|---|---|---|---|
| | | Wt. Percent Yield | Melting Point, °C. | Reduced Viscosity [1] |
| Hexane [2] | 1.9 | 84 | 203–205 | 22 |
| Toluene [2] | 2.4 | 76 | 204–206 | 21 |
| Dioxane | 2.3 | 86 | 203–205 | 37 |
| Diethyl ether | 4.3 | 75 | 204–207 | 25 |
| Tetrahydrofuran | 7.5 | 95 | 203–205 | 37 |
| Methyl isobutyl ketone | 13 | 92 | 210 | 72 |
| Diethyl ketone | 17 | 95 | 210–211 | 64 |
| Methyl ethyl ketone | 18.5 | 95 | 211 | 76 |
| Acetone | 21 | 95 | 211 | 54 |
| Dimethyl formamide | 37.6 | 90 | 210 | 43 |
| Dimethyl sulfoxide | 49 | 92 | 209 | 43 |

[1] In cc./g. of a 0.5% solution of product in dimethyl sulfoxide at 175° C.
[2] Polymerization had to be initiated by heating.

Only the last six solvents in Table I fall within the purview of this invention in respect to degree of polarity (i.e., dielectric constant above 10) and all of these have $pK_a$ values above 14; whereas the results obtained with the first group of five solvents of lower polarity are set forth for purposes of comparison. It is apparent that significantly better yields are usually realized in employing the second or polar group of solvents in the table. Moreover, the polymers produced in this group of polar solvents have substantially higher molecular weights in all instances than is the case with the relatively nonpolar solvents as is indicated by their higher and sharper melting points and especially by their higher solution viscosities. Among the various aliphatic monoketones, acetone is preferred since it prevents too vigorous a reaction, owing to its low boiling point, and also by reason of its low cost. However, other higher boiling ketones are equally effective as polymerization-promoting solvents, and some are even more effective than acetone. Dimethyl formamide and dimethyl sulfoxide are among the other suitable solvents.

Results of a generally similar character are noted in the polymerization of propylene sulfide in the presence of sodium introduced into various solvents under comparable conditions as evidenced by the data in the following table.

TABLE II

| Solvent | Dielec. Constant Solvent | Polypropylene Sulfide Product | | |
|---|---|---|---|---|
| | | Yield, wt. percent | Nature | Reduced Viscosity [1] |
| Diethyl ether | 4.3 | 10 | Oil | |
| Toluene | 2.4 | 45 | Viscous oil | 10 |
| Tetrahydrofuran | 7.5 | 78 | do | 30 |
| Acetone | 21 | 90 | Rubber-like solid. | 50 |

Other thiiranes which were polymerized by the process of the present invention at higher rates in the presence of ketones include 1-butene sulfide, styrene sulfide, and 3-phenoxypropene sulfide-1.

Other alkali metals, such as lithium, potassium, rubidium and cesium may be used in place of sodium in the instant process. The alkali metal reacts with a ketone to form an alkali metal compound of the ketone, which is the actual initiator of the polymerization. Hence, certain other highly basic compounds of the alkali metal can be used instead of the metal per se. Compounds of this type include lithium and other alkali metal hydrides, potassium and other alkali metal amides, sodium ethoxide and other alkali metal alkoxides, potassium and other alkali metal oxides, and also organo-alkali metal compounds, as exemplified by phenyl lithium, butyl lithium and phenyl sodium.

Alkali metals and various compounds thereof which are suitable for introduction into the solvents previously described in carrying out the process of the present invention may be conveniently described as a class as alkali metals in highly basic forms capable of combining with acetone or other aliphatic monoketones as by metalating the ketone.

The form in which the initiator is used and the method by which it is formed are not important, but finely divided or dispersed material is preferred. However, the presence of the polar solvent is essential for increasing the reaction rate. For instance, acetone-sodium in a hydrocarbon solvent or in ether is a very weak catalyst for the polymerization of ethylene sulfide.

The polymerization rate depends to a certain extent on the electronegativity (basicity) of the alkali metal or alkali compound in the known order

$Li < Na < K < Rb < Cs$

In most cases, the activity of sodium is sufficient, and from the viewpoint of economy sodium is the preferred catalyst. The catalyst is preferably used in concentrations between about 0.001 and 0.5 mol percent of the monomer. While polymerization may also be effected with larger quantities, e.g. 10 mol percent, such an increase in the catalyst concentration generally does not produce any advantage.

The polymerization rate can be controlled by regulating the reaction temperature and the concentration of monomer. In order to achieve high rates of polymerization, temperatures between about 20 and 50° C. and concentrations between about 10 and 50 parts of the thiirane in 100 parts of solvent are recommended for most purposes, but the reaction conditions should be adapted to the particular thiirane used in each individual case.

The present invention is of especial importance in the preparation of polyethylene sulfide of valuable properties. Polyethylene sulfide prepared by the instant process is a thermoplastic material with very good mechanical strength, which melts at approximately 210° C.; it has high crystallinity and is resistant to a great many organic solvents at temperatures up to 150° C. Polymers of higher thiirane homologs may be low-melting or elastomeric solids of high molecular weight or they may be viscous oils of low molecular weight.

For a better understanding of the nature and objects of this invention, reference should be had to the following illustrative examples. All proportions set forth hereinbefore and hereinafter are expressed in terms of weight unless otherwise stated.

*Example 1*

In a glass flask equipped with stirrer and reflux condenser, 75 ml. of acetone was treated in a nitrogen atmosphere with 0.1 ml. of a 10% by weight dispersion of sodium in toluene. The acetonesodium compound precipitated in the form of a white substance. To this suspension 25 grams of ethylene sulfide was added, whereupon polymerization started immediately and polyethylene sulfide precipitated in the form of a fine powder, the temperature rising up to the boiling point of the solvent. After 10 minutes polymerization was completed. For working up the mixture 200 ml. of 10% hydrochloric acid was added, followed by stirring for 15 minutes at 100° C. The polymer was filtered, washed with large quantities of hot water and then dried in a vacuum drier at 50° C. to produce 24.8 grams of a colorless powder that melted sharply at 211° C. The relatively viscosity (specific viscosity) of a 0.5% solution of the product in dimethyl sulfoxide at 175° C. was 1.30, corresponding to a reduced viscosity (viscosity number) of 60 cc./g. Test specimens produced from this substance by injection molding had a flexural strength of 9,000 to 10,700 pounds per square inch.

*Example 2*

Example 1 was repeated with modifications in that 100 ml. of acetone was used and the temperature during the polymerization reaction was kept at approximately 10° C. by external cooling. A yield of 24.2 grams of polyethylene sulfide melting at 210° C. was obtained. Its reduced viscosity in dimethyl sulfoxide at 175° C. amounted to 69 cc./g.

*Example 3*

Example 1 was repeated with the sodium replaced by the equivalent quantity of 16 mg. of potassium suspended in toluene. The resulting potassium compound of the acetone is soluble in acetone. Vigorous polymerization occurred and 24.3 grams of polymer (M.P. 209–210° C.) was obtained. The reduced viscosity of this product in dimethyl sulfoxide at 175° C. was 42 cc./g.

*Example 4*

To 30 ml. of acetone were added 10 mg. lithium dispersed in toluene and 10 grams of ethylene sulfide and 5 minutes later polymerization set in slowly without noticeable heat of reaction. After 20 hours, dilute hydrochloric acid was added; then the polymer was washed and dried as usual to obtain 7.6 grams of polyethylene sulfide with a melting point of 211° C. and a reduced viscosity in dimethyl sulfoxide at 175° C. of 44 cc./g.

*Example 5*

Following the general procedure of Example 1, 18 mg. of potassium in toluene and 5 grams of ethylene sulfide were added to 10 ml. of acetone, whereupon polymerization set in spontaneously. After 5 minutes dilute hydrochloric acid was added and the product was washed and dried as usual. A yield of 4.6 grams of polymer (M.P. 209–211° C.) was obtained, and its reduced viscosity in dimethyl sulfoxide at 175° C. was 84 cc./g.

*Example 6*

In a similar manner, various forms of the catalyst were added to solutions of 5 grams of ethylene sulfide in 15 ml. of acetone in quantities of 0.5 mol percent, based on the monomer. The mixtures were stirred for 1 hour without cooling and subsequently processed as described in the preceding examples with the following results.

| Catalyst | Yield, g. | η 175° Reduced (dimethyl sulfoxide) |
|---|---|---|
| Sodium amide | 4.8 | 27 |
| Sodium hydride | 4.8 | 39 |
| Sodium ethoxide | 4.7 | 46 |
| Sodium | 4.7 | 44 |

*Example 7*

To 75 ml. of methyl ethyl ketone were added 10 mg. of sodium (as a 10 percent suspension in toluene) and 25 grams of ethylene sulfide. Polymerization started immediately. After 1 hour 50 ml. of ethanol and 10 ml. of glacial acetic acid were added, and the mixture was boiled for 10 minutes. The polymer was filtered off, washed with methanol and dried to obtain 23.7 grams of polyethylene sufide with a melting point of 210° C. and a reduced viscosity in dimethyl sulfoxide at 175° C. of 45 cc./g.

*Example 8*

The procedure of Example 1 was modified in that the acetone was replaced by dry dimethyl formamide as the solvent and the polymer was washed with hot methanol before drying. A yield of 24.5 grams of polyethylene sulfide was obtained with a melting point of 211° C., and its reduced viscosity in dimethyl sulfoxide at 175° C. amounted to 55 cc./g.

Example 9

To 50 ml. of acetone and 10 grams of propylene sulfide, 16 mg. of sodium were added in the form of 10 percent suspension in toluene. Polymerization started immediately and the reaction was highly exothermic. Subsequently, the reaction mixture was refluxed for 1 hour. The resulting polymer initially remained dissolved in the hot acetone, but is later obtained upon cooling as a precipitate in swollen form. The precipitated polymer was dissolved in benzene, and this solution was washed with dilute hydrochloric acid followed by water. The benzene solution was then evaporated to produce 8.8 grams of a rubber-like polypropylene sulfide which is insoluble or difficultly soluble in ether, ethanol, tetrahydrofuran, dioxane, petroleum ether, and soluble in benzene, toluene and chloroform. The reduced viscosity of a 0.5 percent solution amounted to 96 cc./g. in benzene at 20° C., 1.70 cc./g. in chloroform at 20° C. and 44 cc./g. in dimethyl sulfoxide at 175° C.

Example 10

A quantity of 3-phenoxypropene sulfide-1 amounting to 5 grams was dissolved in 20 ml. of acetone and treated with 1 mol percent of sodium. Within 5 minutes polymerization began in a slightly exothermic reaction, and the polymer remained dissolved in the acetone. The solution was heated for 1 hour at 50° C.; then the acetone was distilled off and the residue was dissolved in benzene and worked up as described in Example 9. The product was 4.6 grams of a rubber-like solid containing 18.3% sulfur and having a reduced viscosity in benzene at 20° C. of 33 cc./g.

While the instant process has been disclosed in considerable detail in the foregoing description and examples, it will be appreciated by those skilled in the art that many other modifications, variations and embodiments are within the scope and spirit of this invention; accordingly, the appended claims should not be construed as limited in any particulars except as may be recited in the claims or required by the prior art.

I claim:

1. A process which comprises homopolymerizing thiiranes in the presence of a polar organic solvent having a dielectric constant above about 10 (measured at 20° C.) in admixture with an alkali metal in a highly basic form capable of combining with acetone.

2. A process according to claim 1 in which said solvent is further characterized by not more than moderate proton acidity.

3. A process according to claim 1 in which the $pK_a$ value of said solvent is above about 14.

4. A process according to claim 1 in which the $pK_a$ value of said solvent is above about 17.

5. A process according to claim 1 in which said solvent is a ketone with a $pK_a$ value above about 14.

6. A process according to claim 1 which said solvent is an aliphatic monoketone.

7. A process according to claim 1 in which said solvent is acetone.

8. A process according to claim 1 in which said alkali metal is sodium.

9. A process according to claim 1 in which said alkali metal is potassium.

10. A process according to claim 1 in which the thiirane is ethylene sulfide.

11. A process which comprises homopolymerizing thiiranes in the presence of an aliphatic monoketone having a $pK_a$ value above about 14 in admixture with potassium in a highly basic form capable of combining with acetone.

12. A process which comprises homopolymerizing thiiranes in the presence of an aliphatic monoketone having a $pK_a$ value above about 14 in admixture with sodium in a highly basic form capable of combining with acetone.

13. A process which comprises homopolymerizing ethylene sulfide in the presence of an aliphatic monoketone having a $pK_a$ value above about 14 in admixture with sodium in a highly basic form capable of combining with acetone.

14. A process which comprises homopolymerizing thiiranes in the presence of a mixture of acetone and sodium metal.

15. A process which comprises homopolymerizing thiiranes in the presence and of a polar organic solvent having a dielectric constant above about 10 (measured at 20° C.) and a $pK_a$ substantially above 10 in admixture with an alkali metal in a highly basic form capable of combining with acetone.

References Cited by the Examiner

UNITED STATES PATENTS

| | | | |
|---|---|---|---|
| 2,183,860 | 12/1939 | Coltof | 260—327 |
| 3,222,324 | 12/1965 | Brodoway | 260—79 |
| 3,222,325 | 12/1965 | Brodoway | 260—327 |
| 3,222,326 | 12/1965 | Brodoway | 260—79 |
| 3,234,236 | 2/1966 | Sander et al. | 260—327 |

OTHER REFERENCES

Ohta et al.: Studies on Ethylene Sulfide (I) Polymerization of Ethylene Sulfide as reported in Chemical Abstracts, vol. 51 (1957), 14668.

Boileau et al.: Academie des Science (Paris), Comptes Rendus, 254, pp. 2773–6 (1962).

DONALD E. CZAJA, *Primary Examiner.*

LEON J. BERCOVITZ, M. I. MARQUIS,

*Assistant Examiners.*